United States Patent [19]
Geist et al.

[11] Patent Number: 4,547,409
[45] Date of Patent: * Oct. 15, 1985

[54] SELF-CROSSLINKING HEAT-CURABLE BINDER

[75] Inventors: Michael Geist, Münster; Horst Diëfenbach, Nottuln, both of Fed. Rep. of Germany

[73] Assignee: BASF Farben & Fasenn A.G., Hamburg, Fed. Rep. of Germany

[ * ] Notice: The portion of the term of this patent subsequent to Jan. 22, 2002 has been disclaimed.

[21] Appl. No.: 657,062

[22] Filed: Oct. 2, 1984

Related U.S. Application Data

[62] Division of Ser. No. 472,639, Mar. 7, 1983, Pat. No. 4,495,335.

[51] Int. Cl.$^4$ ............................................. C08L 67/04
[52] U.S. Cl. ................... 427/386; 427/385.5; 428/423.1; 428/413; 525/438; 525/424; 525/127; 525/440; 525/450; 525/454; 525/528; 525/533; 528/408; 528/403; 528/48; 528/341; 528/113; 528/114; 528/111; 528/110; 528/45; 528/61

[58] Field of Search ............................ 427/386, 385.5; 428/423.1, 413; 525/438, 424, 127, 440, 450, 454, 528, 533; 528/408, 403, 48, 341, 113, 114, 111, 110, 45, 61

[56] References Cited

U.S. PATENT DOCUMENTS 4,364,860 12/1982 Patzschke et al. .................. 524/424
4,373,059 2/1983 Patzschke et al. .................. 524/424
4,373,072 2/1983 Patzschke et al. .................. 524/424

Primary Examiner—John Kight
Assistant Examiner—Marvin L. Moore

[57] ABSTRACT

The invention relates to a self-crosslinking heat-curable binder, in particular for electropaints, which is based on an organic synthetic resin which contains primary and-/or secondary and, if desired, also tertiary amino groups and esterified carboxyl groups and is water-dilutable due to partial or complete neutralization with acids. The esterified carboxyl groups are activated in the alcohol component by a substituent which induces a negative inductive effect.

5 Claims, No Drawings

SELF-CROSSLINKING HEAT-CURABLE BINDER

This is a division of application Ser. No. 472,639, filed Mar. 7, 1983, now U.S. Pat. No. 4,495,335.

BACKGROUND OF THE INVENTION

The invention relates to a self-crosslinking heat-curable binder, in particular for electropaints, which is based on an organic synthetic resin which contains primary and/or secondary and, if desired, also tertiary amino groups and esterified carboxyl groups and is water-dilutable due to partial or complete neutralization with acids.

German Offenlegungsschrift No. 2,936,411, corresponding to U.S. Pat. No. 4,373,072 discloses a coating agent which contains a synthetic resin which contains primary and/or secondary and, if desired, also tertiary amino groups and terminal esterified carboxyl groups which are largely stable in a neutral aqueous medium but are reactive in a basic medium at elevated temperatures to the primary and/or secondary amino groups of the synthetic resin. According to the example of German Offenlegungsschrift No. 2,936,411, baking is carried out at 180° C. for 25 minutes.

In this known synthetic resin, only those monoalcohols are used as the alcohol component of the carboxylate groups which contain 1 to 18, preferably 1 to 6, carbon atoms in the molecule. Low-boiling alcohols which have a boiling point of less than 140° C. are particularly preferred. The reactivity of the esters is increased by increasing the electrohphilic activity of the carboxyl group. It is said that the incorporation of methyl, ethyl and/or propyl esters of lactic acid or dimethylolpropionic acid is particularly suitable. The use of monoalcohols as the esterification component has the disadvantage that the resulting carboxylate groups are not sufficiently reactive despite their activation in the carboxylic acid component.

SUMMARY OF THE INVENTION

It has now been found, surprisingly, that binders having improved properties in respect of their preparation, the quality of the resulting coatings and the baking conditions are obtained when the carboxylate groups contained in them are activated in the alcohol component.

The invention therefore relates to a binder of the type mentioned in the introduction, in which the esterified carboxyl groups are activated in the alcohol component by at least one substituent which induces a negative inductive effect.

This activation is advantageously achieved by the esterified carboxyl groups being β-hydroxyalkyl ester groups.

In a further advantageous embodiment of the invention, the esterified carboxyl groups are carbalkoxymethyl ester groups. This results in particularly effective activation.

DESCRIPTION OF THE PREFERRED EMBODIMENTS

Binders according to the invention offer the following advantages: the alcohol components used, i.e. in The case of β-hydroxyalkyl esters the diols, and in the case of carbalkoxymethyl esters hydroxyacetates, are particularly advantageous leaving groups, which is why effective activation of the carboxylate group is achieved. This in turn leads to effective crosslinking in the ultimately resulting film. The alcohol components used according to the invention are superior in this respect to the monoalcohols, it being possible under otherwise identical conditions to reduce baking temperatures or times. If monoalcohols, such as methyl, ethyl or butyl alcohol, are used to esterify the carboxyl groups, the amidation reaction to crosslink the binder proceeds to an inadequate extent or too slowly. The crosslinking rate is in this case lower, and the baked coating is insufficiently resistant to solvents. Moreover, the carboxylate groups according to the invention, which are activated in the alcohol component, can be prepared more advantageously than the monoalcohol-containing ester groups. For instance, the β-hydroxyalkyl ester groups can be obtained by reacting a carboxyl group with an epoxy compound, and the carbalkoxymethyl ester groups can be obtained by reacting a carboxylic acid salt with a halogenoacetate. Both cases are reactions which can be carried out under mild conditions. This avoids any secondary reactions, such as, for example, transesterifications, and a more uniform product is formed. A further advantage of binders according to the invention is that the compounds set free in baking, namely the said diols and hydroxyacetates, are particularly good flow-control agents, giving coatings having a very good surface. For instance, ethyl hydroxyacetate as such is already known as a flow-control agent, and the invention enables this compound to be set free during baking, and allowing a particularly good effect to be achieved. In contrast, the liberation of low-boiling alcohols gives rise to the danger of boilers and other film defects in the coating.

The synthetic resin according to the invention is particularly preferred for use as a binder for cathodically depositable electropaints. When put to this use, it can advantageously also be deposited combined with a finely divided solid resin by the EPC (electro powder coating) process. However, the synthetic resin is also suitable for use as a binder for conventional, solvent-containing baking finishes and for powder finishes.

The coating agents obtained, as will be self-evident to a skilled worker, can also contain pigments, fillers, crosslinking catalysts, corrosion inhibitors and other known paint auxiliaries.

During baking, then, the β-hydroxyalkyl ester groups or the carbalkoxymethyl ester groups react with the primary and/or secondary amino groups and form amide bonds. The basic nitrogen of the amino group is thus converted into a pH-neutral amide nitrogen in the baked coating, and hence the latter contains only few basic imperfections. The principle of the crosslinking mechanism can be described by the following reaction equations:

a. Crosslinking by reacting the amino group with the β-hydroxyalkyl ester group:

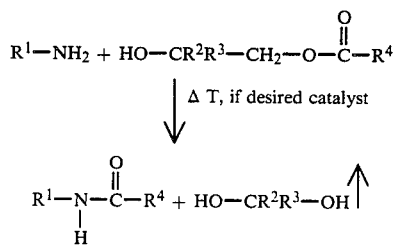

$R^1$ and $R^4$ = radical of binder molecule
$R^2$ and $R^3$ = H or an alkyl or substituted alkyl radical b. Crosslinking by reacting the amino group with the carbalkoxymethyl ester group:

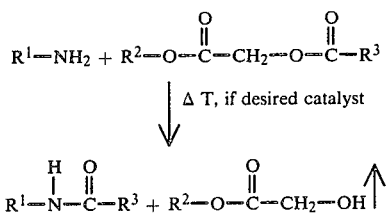

$R^1$ and $R^3$ = radical of binder molecule
$R^2$ = alkyl

Virtually no amino groups are split off during baking, and off-gas problems are thus reduced. The eliminated diols or hydroxyacetates preferably have a boiling point which is in proximity of the baking temperature, so that during the baking process they act as particularly effective flow-control agents.

The amide bond formed in the course of baking has a very beneficial effect on the adhesion of the film, in particular to metal substrates. It also increases the resilience of the film. This crosslinking mechanism brings about a high degree of resistance of the paint film to solvents, alkalis and salt spray mists. Even on sheet-metal which has not been pretreated the films form very resistant coatings even without corrosion inhibitors.

The synthetic resin advantageously contains 1 to 5 primary and/or secondary amino groups and 1 to 5 activated ester groups per 1,000 molecular weight units.

The equivalence ratio between the primary and/or secondary amino groups and the activated carboxylate groups is advantageously 2:1 to 1:2, an equivalence ratio of about 1:1 being particularly preferred.

The binder is thus an organic synthetic resin which contains primary and/or secondary amino groups and activated carboxylate groups as reactive groups. If desired, it can additionally contain tertiary amino groups. Epoxy-containing resins having, preferably, terminal epoxy groups from the group consisting of polyglycidyl ethers polyglycidyl esters and polyglycidylamines are particularly suitable for preparing self-crosslinking heat-curable binders according to the invention. Accordingly, the synthetic resin has advantageously been prepared by reacting a polyglycidyl ester or ether with a compound which carries two groups which are reactive toward epoxy groups and at least one activated carboxylate group to give an intermediate product having terminal epoxy groups, and reacting these epoxy groups (their rings open) with a primary or secondary amine, a ketimine or aldimine which has a hydrogen atom on the nitrogen atom or an aminoalcohol which is blocked at the nitrogen atom.

For the purposes of this invention polyglycidyl ethers are preferably understood as meaning those polyglycidyl ethers of the general formula

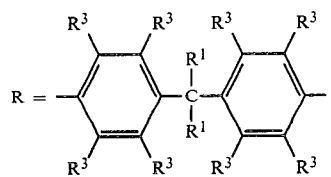

$R^1$ = H or $C_nH_{2n+1}$
$R^2$ = $(CR^1)n$
$R^3$ = $R^1$, halogen and, preferably, H, and
n = 0 to 20.

The polyglycidyl ethers of the general formula shown have a number average molecular weight of about 340 to 5,000 and, correspondingly, an epoxide equivalent weight of 170 to 2,500. The epoxy resins can also be used in the hydrogenated or partially hydrogenated form. To control the film properties some or all of the reactive groups of the epoxy resin can be reacted with other compounds. The following are suitable for this purpose:

(a) carboxyl-containing compounds, such as saturated or unsaturated monocarboxylic acids (for example benzoic acid, linoleic acid, 2-ethylhexanoic acid, Versatic acid, aliphatic, cycloaliphatic and/or aromatic dicarboxylic acids of various chain lengths (for example adipic acid, sebacic acid, isophthalic acid or dimeric fatty acids), hydroxyalkanoic acids (for example lactic acid or dimethylolpropionic acid) or carboxyl-containing polyesters or (b) amino-containing compounds, such as diethylamine or ethylhexylamine or diamines having secondary amino groups, such as, for example, N,N'-dialkylenediamine, such as dimethylethylenediamine, N,N'-dialkylpolyoxyalkyleneamine, such as N,N'-dimethylpolyoxypropylenediamine, cyanoalkylated alkylenediamines, such as bis-N,N'-cyanoethylethyldiamine, cyanoalkylated polyoxyalkyleneamines, such as bis-N,N-cyanoethylpolyoxypropylenediamine, polyaminoamides, such as Versamides, or the reaction product of one mole of diaminohexane with two moles of monoglycidyl ether or monoglycidyl ester, specifically glycidyl esters of α-branched fatty acids, such as Versatic acid, or c) hydroxy-containing compounds, such as neopentylglycol, bis-ethoxylated neopentylglycol, neopentylglycol hydroxypivalate, dimethylhydantoin-N,N'-diethanol, hexane-1,6-diol, hexane-2,5-diol, but-2-ene-1,4-diol, but-2-yne-1,4-diol, hex-3-yne-2,5-diol or other alkynediols, 1,4-bis-(hydroxymethyl)-cyclohexane, 1,1-isopropylidene-bis-(p-phenoxyl)-2-propanol, trimethylolpropane, pentaerythritol or aminoalcohols, such as triethanolamine, methyldiethanolamine or hydroxy-containing alkyl ketimines, such as aminomethylpropane-1,3-diol isobutyl methyl ketimine or tris-(hydroxymethyl)-aminomethane cyclohexane ketimine, and also polyglycol ethers, polyester-polyols, polyetherpolyols, polycaprolactonepolyols of various functionality and molecular weights.

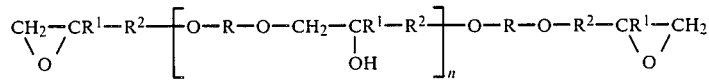

in which

In place of polyglycidyl ethers based on bisphenol A it is also possible to use polyglycidyl ethers based on other components, such as triglycidyl isocyanurate, heterocyclic diglycidyl compounds or diglycidylhydantoins.

Reaction products of, for example, bisglycidyl terephthalate or bisglycidyl isophthalate with, for example, bisphenol A or of the component carrying the activated ester group are suitable for use as polyglycidyl esters. The epoxide equivalent weight of these products is between 200 and 2,500. To control the film properties some of the remaining reactive glycidyl groups can be reacted with other compounds. Compounds suitable for this purpose are those mentioned above under a, b and c.

Polyglycidylamines are understood as meaning those glycidyl-containing resins which are obtained by introducing glycidyl groups, via, for example, epichlorohydrin, into $NH_2$-functional resins.

In a further advantageous embodiment of the invention, the synthetic resin is a polyurethane resin which has been prepared by reacting a diisocyanate with a compound which carries two groups which are reactive toward isocyanate groups and at least one activated carboxylate group to give an intermediate product having terminal isocyanate groups, and reacting these isocyanate groups with a primary or secondary amine, a ketimine or aldimine which has a hydrogen atom at the nitrogen atom or an aminoalcohol blocked at the nitrogen atom.

It is thus also possible to use as binders base resins having at least 2 isocyanate groups. Preferred isocyanate-containing resins are higher-functional polyisocyanates which are obtained by trimerizing or oligomerizing the diisocyanates or polysiocyantes with polyfunctional OH- or NH-containing compounds. Typical isocyanates are toluylene diisocyanates, hexamethylene diisocyanate, 4,4'-dimethylmethane diisocyanate, 4,4'-dicyclohexylmethane diisocyanate, 1,6-diisocyanate-2,2,4-trimethylhexane and 1-isocyanatomethyl-3-isocyanato-1,5,5-trimethylcyclohexane.

Partially epoxidized polybutadienes are likewise suitable for being modified with amino-containing compounds and compounds containing β-hydroxyalkyl ester groups or carbalkoxymethyl ester groups.

Partially epoxidized polybutadiene oils are understood here as meaning reaction products which are obtained by reacting commercially available polybutadiene oils with per-acids or organic acid/$H_2O_2$ mixtures. The method of preparation is described, for example, in Chemiker-Zeitung 95, 857 et seq. (1971).

Particularly suitable are also copolymers of acrylates and/or methacrylates which contain, for example, glycidyl acrylate and/or methacrylate or a different glycidyl-carrying olefinically unsaturated polymerizable compound and β-hydroxyalkyl acrylate and/or methacrylate or carbalkoxymethyl acrylate and/or carbalkoxymethyl methacrylate. The glycidyl groups can be modified in a further reaction step with the amino-carrying compound. However, it is also possible to use suitable amino-containing monomers in the monomer mixture to be polymerized.

The copolymers preferably have a number average molecular weight of 700 to 15,000. Preferred monomers are acrylates and methacrylates having 1 to 8 carbon atoms in the alcohol moiety. However, the copolymers can also contain further monomers, such as (meth)acrylamide, styrene, vinyltoluene or vinylcarbazole. The copolymerization is effected in a well-known manner by means of solution, suspension or emulsion polymerization with added initiators, such as peroxides, hydroperoxides, per-esters or thermolabile azo compounds and, if desired, molecular weight regulators.

The primary and/or secondary amino groups are preferably introduced into the organic resin by reacting a polyamide and/or an amino- and/or hydroxyl-containing ketimine with resins which contain at least one, preferably at least two, epoxy groups or isocyanate groups or another suitable reactive group per molecule. However, a binder having reactive amino groups can also be obtained by means of other addition reactions, for example by esterifying or amidating compounds carrying primary and/or secondary amino groups with resins containing groups suitable for this purpose.

In particular polyamines and/or amino- and/or hydroxyl-containing ketimines are suitable for introducing the amino groups. If the addition reaction is carried out with the compound carrying the primary and secondary amino groups in the form of its ketimines, the reaction conditions chosen should be such that no ketimine-decomposing substance remains in the reaction product. The preferred ketimines are reaction products of ketones and alkylamines or alkyldiamines which contain hydroxyl or secondary amino groups and have the general structure R—NH—R'—$NH_2$ or HO—R—$NH_2$. The ketimines have, for example, the following structures:

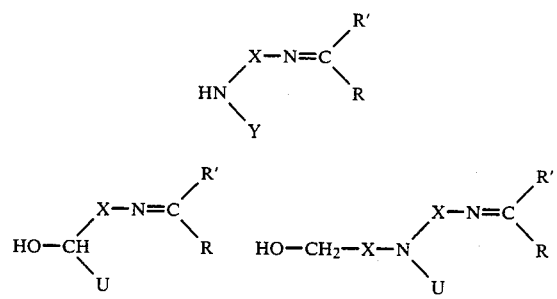

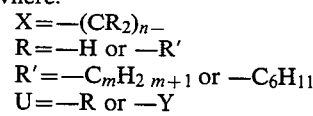

where:
X=—$(CR_2)_n$—
R=—H or —R'
R'=—$C_mH_{2m+1}$ or —$C_6H_{11}$
U=—R or —Y

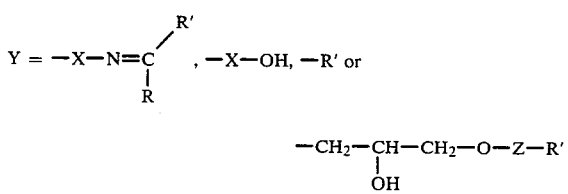

Z=═CO or —X
n=1–6
m=1–12

The ketones used for the reaction with the primary amino groups are in general aliphatic ketones, such as ethyl methyl ketone, diethyl ketone, isobutyl methyl ketone, ethyl n-propyl ketone and cycloaliphatic ketones, such as cyclopentanone and cyclohexanone. The preferred aminoalkylamines and alkanolamines are in the main diethylenetriamine, N-methylethylenediamine, N-methylpropylenediamine, N-aminoethylpiperazine, 2-aminoethanol, 1-aminopropan-2-ol, 1-aminopropan-3-ol, 2-amino-2-methylpropan-1-ol, 3-amino-2,2-dimethylpropan-1-ol, 1,5-diaminopentan-3-ol or N-(2-aminoethyl)-N-(2-hydroxyethyl)-ethylenediamine.

The exothermic addition of the aminoketimines described above to the epoxy groups of the base resin of binder component A is in general carried out at room temperature. The reaction is frequently completed at temperatures between 50° and 125° C. to effect complete conversion.

The addition of the hydroxyketimines to the epoxy groups of the base resin of binder component A is generally carried out within the same temperature range, but the use of a basic catalyst, such as N,N-dimethylbenzylamine, or even of a Friedel-Crafts catalyst, such as a tin(II) chloride, is advisable.

Compounds particularly suitable for introducing the activated ester groups into the binder have one or more carboxylic acid groups in addition to further reactive groups which enable incorporation into the binder. The carboxylic acid group can be converted into the desired $\beta$-hydroxyalkyl ester group or carbalkoxymethyl ester group before or after incorporation into the binder. Examples of compounds which have these possible ways of reacting are dihydroxymonocarboxylic acids, such as 2,2-bis-(hydroxymethyl)-propionic acid, 4,4(4,4'-bis-hydroxyphenyl)-valeric acid, 3,5-dihydroxybenzoic acid, dihydroxydicarboxylic acids, such as tartaric acid, 1,1-methylene-bis-(2-hydroxy-3-naphthoic acid) and aminocarboxylic acids, such as 11-aminoundecanoic acid, 3-aminopropionic acid or 4-aminobenzoic acid.

These compounds, which contain an activated ester group, can be reacted via their reactive groups, in particular via hydroxyl or amino groups, with reactive groups in the resin binder. For this purpose the resin binder preferably has epoxy or isocyanate groups. The reactive groups can have been incorporated in the binder in the terminal position or along the molecular chain.

The electrocoating process requires the binder mixture after protonation with acid to be in the form of an aqueous solution or dispersion. The water-solubility of the binder is brought about by neutralizing with acids the primary, secondary and/or tertiary amino groups contained in the binder. Suitable acids are in particular organic acids, but it is also possible to use, for example, hydrochloric acid or phosphoric acid. The amino groups are preferably neutralized with formic acid, acetic acid, malonic acid, lactic acid or citric acid.

The acids mentioned can also be used when the solubilizing groups are introduced by adduct formation of an ammonium group or the salt of a sulfide/acid or phosphine/acid mixture with the binder.

The degree to which the solubilizing groups are neutralized is, relative to these groups, between 0.2 and 1.0 equivalent, and preferably between 0.25 to 0.6 equivalent, of acid.

The neutralization can be carried out as follows. The acid, if desired together with dispersant, is initially introduced in water, and the resin solution is stirred into the water at room temperature or, if desired, at elevated temperatures. However, the acid can also be added directly to the resin solution. The neutralized resin solution can then be stirred into the water, but, if desired, the water can also be slowly incorporated into the resin solution.

The dispersion can contain up to 20% of organic solvents to control its viscosity, the deposition voltage and the spreading process. If, due to the method of preparation chosen, the batch contains too much solvent or even solvent which has an adverse effect on the properties, it can be distilled from the resin solution before dispersion or it is distilled from the aqueous dispersion. It is beneficial to the sum total of all properties if the organic solvent content is as small as possible.

The solids content of a deposition bath which has been made up with binders according to the invention is 7–35 parts by weight, but preferably 12–25 parts by weight. The pH of the deposition bath is between 4 and 8, but preferably between 5 and 7.5. Non-corroding steel anodes or graphite anodes are used as the anodes of the deposition bath. The temperature of the bath should be between 15° and 35° C., preferably between 20° and 30° C. The deposition time and voltage are chosen in such a way that the desired film thickness is obtained.

After the deposition process the coated article is rinsed and ready for baking.

Regardless of how the coating agent based on the binder according to the invention has been applied, the paint film is crosslinked in the course of baking at temperatures of 130° to 200° C. for a period of 10–60 minutes, preferably at 150° to 180° C. for 15–30 minutes.

The amidation reaction can be accelerated by suitable catalysts. Compounds particularly suitable for this purpose are ammonium compounds, such as benzyltrimethylammonium hydroxide, benzyltrimethylammonium chloride, trimethylcetylammonium bromide or tetraammonium iodide, organic tin compounds, such as dibutyltin dilaurate, iron(III) acetylacetonate, zinc acetate, zinc 2-ethylhexoate, cobalt naphthenate, lead acetate, lead octoate or butyl titanate.

The binder is pigmented in a well-known manner, whereby the pigments and customary additives, such as fillers, corrosion inhibitors and antifoams, are milled into the binder. Examples of milling machines which can be used are sand mills, ball mills and three-roll mills.

The paint can be completed in a generally known manner.

The invention also relates to a process for preparing a binder, in particular for electropaints, which comprises reacting a polyglycidyl ester or ether with a compound which carries two groups which are reactive toward epoxy groups and at least one carboxylate group which is activated in the alcohol component by a substituent which induces a negative inductive effect to give an intermediate product having terminal epoxy groups, and reacting these epoxy groups (their rings open) with a primary or secondary amine, a ketimine or aldimine which has a hydrogen atom on the nitrogen atom or an aminoalcohol which is blocked at the nitrogen atom.

The invention also relates to a process for preparing a binder, in particular for electropaints, which comprises reacting a diisocyanate with a compound which carries two groups which are reactive toward isocyanate groups and at least one carboxylate group which is activated in the alcohol component by a substituent which induces a negative inductive effect to give an intermediate product having terminal isocyanate groups, and reacting these isocyanate groups with a primary or secondary amine, a ketimine or aldimine which has a hydrogen atom at the nitrogen atom or an aminoalcohol which is blocked at the nitrogen atom.

The invention also relates to the use of the binders for preparing electrocoating baths for the electrocoating process.

The invention also relates to a process for preparing coatings, in which an electrically conductive substrate is dipped into an aqueous electrocoating bath which contains binder which is at least partially neutralized by acid and is based on an organic synthetic resin which contains primary and/or secondary amino groups and esterified carboxyl groups, and connected as the cathode, a film is deposited by direct current onto the substrate, the substrate is removed from the bath and the film is hardened by baking into a coating, which comprises that the esterified carboxyl groups of the synthetic resin are activated in the alcohol component by a substituent which induces a negative inductive effect and are reacted in the course of baking with the primary and/or secondary amino groups to form amide groups.

The invention finally also relates to a coated substrate which has been prepared by the process described.

Below, the invention is illustrated in more detail by means of examples.

EXAMPLE 1

(a) Preparation of
2-hydroxy-3-(1-oxo-2-methyl-2-ethylheptoxy)-propyl 4,4-(4,4'-dihydroxydiphenyl)-pentanoate A 10 liter reaction vessel which is equipped with a reflux condenser, a stirrer and an internal thermometer is charged with 3,810 g of 4,4-(4,4'-dihydroxydiphenyl)-pentanoic acid, 3,855 g of glycidyl 2-methyl-2-ethylheptanoate and 1,897 g of cyclohexanone. 19 g of a Cr-containing catalyst are added. The batch is heated to 90° C., and kept at this temperature until the acid number has dropped to <1 and the epoxy content is <0.3%. The solids content is 80% of 2-hydroxy-3-(1-oxo-2-methyl-2-ethylheptoxy)-propyl 4,4-(4,4'-dihydroxydiphenyl)-pentanoate.

(b) Self-crosslinking binder I

A 4 liter reaction vessel which is equipped with an internal thermometer, a stirrer, a reflux condenser and a nitrogen inlet tube is charged with 1,654 g of a commercially available epoxy resin (EEW 188) together with 1,696 g of the reaction product of Example 1 under a nitrogen blanket, and the mixture is heated to 130° C. 20 ml of dimethylbenzylamine are then added. The reaction becomes exothermic. The temperature is then kept at 165° C. until an EEW of 1,520 has been reached. The batch is then cooled down to 105° C., and 176.2 g of diethylenetriamine[di(isobutyl methyl ketimine)] and 262 g of N-methyl-1,3-propanediamine isobutyl methyl ketimine are added. The batch is kept at 105° C. for 1.5 hours and then cooled down to 90° C., 190 g of 2,2,4-trimethylpentane-1,3-diol monoisobutyrate are added, and the mixture is stirred for 20 minutes. In the meantime a dispersing bath has been prepared from 4,630 g of deonized water, 38.5 g of a commercially available defoamer and 66 g of glacial acetic acid. The resin solution is stirred into this bath.

A further 2,406 g of deionized water are added after 2 hours.

The dispersion is adjusted with deionized water to a 20% solids content and with acetic acid to pH 6.3. This dispersion can be used to cathodically deposit a paint film onto zinc-phosphated sheet-metal, in an electrocoating cell. The coating is carried out at 330 V for 2 minutes. Baking at 180° C. for 20 minutes gives a coating which has good flow and is resistant to solvents. The film thickness is 21 μm.

EXAMPLE 2

(a) Preparation of carbethoxymethyl 2,2-bis-(hydroxymethyl)-propionate

A 5 liter reaction vessel which is equipped with a stirrer, an internal thermometer, a reflux condenser and a 1 liter dropping funnel, is charged with 550 g of 2,2-bis-(hydroxymethyl)-propionic acid together with 2,460 g of cyclohexanone, and the mixture is heated to 100° C. When the bulk of the dihydroxycarboxylic acid has dissolved, the mixture is cooled down to 60° C., and 414 g of triethylamine are added. The temperature is kept at 60° C. by cooling. The resulting triethylammonium 2,2-bis-(hydroxymethyl)-propionate remains in solution. 7 g of potassium iodide are then added, and 500 g of ethyl chloroacetate are added in the course of 30 minutes. The batch is kept at this temperature for a further 4 hours and is then allowed to cool down to room temperature, where the triethylammonium chloride formed is filtered off. The filtrate is concentrated to an 80% solids content in a rotary evaporator.

(b) Self-crosslinking binder II

A 4 liter reaction vessel which is equipped with a stirrer, an internal thermomemter, a nitrogen inlet tube and a reflux condenser, is charged with 888 g of 4,4'-diisocyanatodiphenylmethane in 344 g of butyl acetate. The batch is thoroughly blanketed with nitrogen. 732 g of the 80% strength adduct solution of Example 2(a) are added a little at a time. During this addition the temperature should not exceed 45° C. When the addition has ended the batch is allowed to react at 60° C. for a further 3 hours and is then cooled down to 40° C., whereupon 146 g of diethylenetriamine in 1,488 g of butyl acetate are added. The reaction is allowed to continue for a further 1½ hours after the addition is complete.

Paint films from this resin solution (deposited at 270 V for 2 minutes) can be baked at 170° C. in the course of 20 minutes. They have spread out smooth, and are resistant to solvents. The dry film thickness is 23 μm.

We claim:

1. Electrocoating baths for electrocoating processes containing a self-cross-linking heat-curable binder based on an organic synthetic resin which contains amino groups and esterified carboxyl groups and is water-dilutable due to neutralization with acids, in which the esterified carboxyl groups are activated in the alcohol component and are β-hydroxyalkyl ester groups or carbalkoxymethyl ester groups and said organic synthetic resin is an epoxy resin which has been prepared by reacting a polyglycidyl ester or ester with a compound which carries two groups which are reactive toward epoxy groups and at least one of said esterified carboxyl groups to give an intermediate product having terminal epoxy groups, and reacting said terminal epoxy groups having open rings with a compound selected from the group consisting of primary amines, secondary amines, ketimines having a hydrogen atom on the nitrogen atom, and aminoalcohols blocked at the nitrogen atom or a polyurethane resin which has been prepared by reacting a diisocyanate with a compound which carries two groups which are reactive toward isocyanate groups and at least one of said esterified carboxyl groups to give an intermediate product having terminal isocyanate groups, and reacting said terminal isocyanate groups with a compound selected from the group consisting of primary amines, secondary amines, ketimines having a hydrogen atom on the nitrogen atom, aldimines having a hydrogen atom on the nitrogen atom, and aminoalcohols blocked at the nitrogen atom.

2. A process for preparing coatings, comprising dipping an electrically conductive substrate into an aqueous electrocoating bath and connecting said substrate as a cathode, said bath containing a self-cross-linking heat-curable binder based on an organic synthetic resin which contains amino groups and esterified carboxyl groups and is water-dilutable due to neutralization with acids, in which the esterified carboxyl groups are activated in the alcohol component and are $\beta$-hydroxylalkyl ester groups or carboalkoxymethyl ester groups and said organic synthetic resin is an epoxy resin which has been prepared by reacting a polyclycidyl ester or ether with a compound which carries two groups which are reactive toward epoxy groups to give an intermediate product having terminal epoxy groups, and reacting said terminal epoxy groups having open rings with a compound selected from the group consisting of primary amines, secondary amines, ketimines having a hydrogen atom on the nitrogen atom, and aminoalcohols blocked at the nitrogen atom or a polyurethane resin which has been prepared by reacting a diisocyanate with a compound which carries two groups which are reactive toward isocyanate groups and at least one of said esterified carboxyl groups to give an intermediate product having terminal isocyanate groups, and reacting said terminal isocyanate groups with a compound selected from the group consisting of primary amines, secondary amines, ketimines having a hydrogen atom on the nitrogen atom, aldimines having a hydrogen atom on the nitrogen atom, and aminoalcohols blocked at the nitrogen atom, depositing a film on said substrate by direct current, removing said substrate from said bath, and hardening said film by baking into a coating wherein said esterified carboxyl groups are reacted in the course of said baking with said amino groups to form amide groups.

3. The process of claim 2, in which the synthetic resin contains 1 to 5 primary amino groups, secondary amino groups, or a mixture thereof, and 1 to 5 activated ester groups per 1,000 molecular weight units.

4. The process of claim 3, in which the equivalent ratio between the primary and/or secondary amino groups and the activated carboxylate groups is 2:1 to 1:2.

5. A coated substrate prepared by the process of claim 2.

* * * * *